(12) United States Patent
Yamamoto et al.

(10) Patent No.: US 11,287,263 B2
(45) Date of Patent: Mar. 29, 2022

(54) POSITION CAPTURING SYSTEM AND POSITION CAPTURING METHOD

(71) Applicant: AICHI STEEL CORPORATION, Tokai (JP)

(72) Inventors: Michiharu Yamamoto, Tokai (JP); Tomohiko Nagao, Tokai (JP); Hitoshi Aoyama, Tokai (JP)

(73) Assignee: AICHI STEEL CORPORATION, Tokai (JP)

( * ) Notice: Subject to any disclaimer, the term of this patent is extended or adjusted under 35 U.S.C. 154(b) by 259 days.

(21) Appl. No.: 16/644,972

(22) PCT Filed: Aug. 29, 2018

(86) PCT No.: PCT/JP2018/032007
§ 371 (c)(1),
(2) Date: Mar. 6, 2020

(87) PCT Pub. No.: WO2019/054183
PCT Pub. Date: Mar. 21, 2019

(65) Prior Publication Data
US 2020/0284586 A1 Sep. 10, 2020

(30) Foreign Application Priority Data
Sep. 12, 2017 (JP) .............................. JP2017-174458

(51) Int. Cl.
*G01C 21/28* (2006.01)
*G08G 1/16* (2006.01)
(52) U.S. Cl.
CPC ............. *G01C 21/28* (2013.01); *G08G 1/163* (2013.01)
(58) Field of Classification Search
CPC ......... G01C 21/28; G01C 21/04; G08G 1/163
See application file for complete search history.

(56) References Cited

U.S. PATENT DOCUMENTS 6,336,064 B1 * 1/2002 Honkura .............. B62D 15/025
701/23
6,378,772 B1 * 4/2002 Yonemura .............. G06K 1/125
235/384

(Continued)

FOREIGN PATENT DOCUMENTS

EP 2012211 A1 1/2009
EP 3467437 A1 4/2019

(Continued)

OTHER PUBLICATIONS

International Search Report and Written Opinion dated Nov. 27, 2018 for PCT/JP2018/032007 filed on Aug. 29, 2018, 9 pages including English Translation of the International Search Report.

(Continued)

*Primary Examiner* — Donald J Wallace
(74) *Attorney, Agent, or Firm* — Xsensus LLP

(57) ABSTRACT

A position capturing system (1) includes a vehicle (5) provided with a measuring unit (2) which magnetically detects a magnetic marker (10) laid in a road and determines a polarity thereof and a GPS unit (35) which measures a position; a database (34) having stored therein a laying position of each of magnetic markers (10) linked with polarity information of the magnetic marker (10); and a position capturing unit (32) which executes processes for capturing the position of the vehicle (5) by selecting corresponding laying position from the database (34) when any of the magnetic markers (10) is detected; and when any of the magnetic markers (10) is detected, selects the laying position located in a specified area with reference to a measured position by the GPS unit (35) and linked with polarity information which complies with the polarity of the detected magnetic marker (10).

7 Claims, 12 Drawing Sheets

(56) References Cited

U.S. PATENT DOCUMENTS

| | | | |
|---|---|---|---|
| 11,049,392 B2 * | 6/2021 | Yamamoto | G01C 21/28 |
| 2002/0143442 A1 * | 10/2002 | Uehara | G01C 21/28 |
| | | | 701/23 |
| 2015/0294566 A1 * | 10/2015 | Huang | G08G 1/133 |
| | | | 701/41 |

FOREIGN PATENT DOCUMENTS

| | | | |
|---|---|---|---|
| JP | 6-34743 A | 2/1994 |
| JP | 10-47983 A | 2/1998 |
| JP | 10-154295 A | 6/1998 |
| JP | 2002-260154 A | 9/2002 |
| JP | 2006-209641 A | 8/2006 |

OTHER PUBLICATIONS

Extended European search report dated Apr. 29, 2021, in corresponding European patent Application No. 18856631.9, 6 pages.

\* cited by examiner

POSITION CAPTURING SYSTEM AND POSITION CAPTURING METHOD

CROSS-REFERENCE TO RELATED APPLICATIONS

The present application is based on PCT filing PCT/JP2018/032007, filed Aug. 29, 2018, which claims priority to JP 2017-174458, filed Sep. 12, 2017, the entire contents of each are incorporated herein by reference.

TECHNICAL FIELD

The present invention relates to a position capturing system and position capturing method for capturing a position of a vehicle.

BACKGROUND ART

Conventionally, position capturing systems using Global Positioning System (GPS) have been known. A vehicle including a GPS unit can measure an absolute position of a target vehicle by using GPS waves and, for example, can display a current position on a map associated with the absolute position (for example, refer to Patent Literature 1).

CITATION LIST

Patent Literature

Patent Literature 1: Japanese Unexamined Patent Application Publication No. 10-47983

SUMMARY OF INVENTION

Technical Problem

However, the above-described conventional position capturing system has the following problem. That is, there is a problem in which depending on the reception status of GPS waves, position capturing may be infeasible or the system may fall into a state in which accuracy of a position to be captured is insufficient.

The present invention was made in view of the above-described conventional problem, and is to provide a position capturing method and position capturing system with high accuracy.

Solution to Problem

One mode of the present invention resides in a position capturing system including, a vehicle provided with a marker detecting part which magnetically detects a magnetic marker laid in a road and determines a polarity of the magnetic marker and a positioning part which measures a position, a position information storage part having stored therein laying positions of each of magnetic markers linked with polarity information indicating the polarity of the magnetic marker, and a position capturing part which selects, when any of the magnetic markers is detected, a laying position corresponding to said any magnetic marker from among the laying positions stored in the position information storage part and captures the laying position or a corrected position with reference to the laying position as a position of the vehicle, wherein the position capturing part selects the laying position located in a specified area with reference to a measured position by the positioning part at a time of detection of said any magnetic marker and linked with the polarity information which complies with the polarity of the magnetic marker detected by the marker detecting part.

One mode of the present invention resides in a position capturing method of capturing, by a vehicle including a positioning part which measures a position, an own vehicle position by using a magnetic marker laid in a road, the method including, a step of setting a specified area, when any of the magnetic markers is detected, with reference to a measured position by the positioning part at a time of detection of said any magnetic marker; and a step of selecting, by referring to a database of laying positions of each of the magnetic markers stored as linked with polarity information indicating the polarity of the magnetic marker, a laying position located in the specified area and linked with the polarity information which complies with the polarity of the detected magnetic marker, wherein the selected laying position or a corrected position with reference to the selected laying position is captured as a position of the vehicle.

Advantageous Effects of Invention

In the present invention, the laying position of the magnetic marker is selected by using the measured position by the positioning part, and the position of the vehicle is captured by using this laying position. Since the magnetic marker is fixed to the road, its laying position does not change and so forth, and positional accuracy can be ensured relatively with ease. When the magnetic marker is detected, using its laying position to capture the own vehicle position allows position capturing with high accuracy.

In particular, in the present invention, when selecting the laying position of the magnetic marker, the polarity of the detected magnetic marker is used. Thus, the laying position corresponding to the detected magnetic marker can be selected with high reliability, thereby allowing position capturing with high accuracy.

DESCRIPTION OF EMBODIMENTS

As a positioning part in the present invention, it may be a unit which measures a position by using GPS, a unit which measures a relative position with reference to a position serving as a reference by inertial navigation calculation, or the like.

As the specified area, it may preferably be an error circle or the like in which the measured position is included at a predetermined ratio or higher.

Modes of the present invention are specifically described by using the following embodiments.

First Embodiment

The present embodiment is an example regarding a position capturing system 1 capable of capturing an own vehicle position (position of a vehicle) with high reliability without depending on an ambient environment. Details of this are described by using FIG. 1 to FIG. 11.

Figure 1:
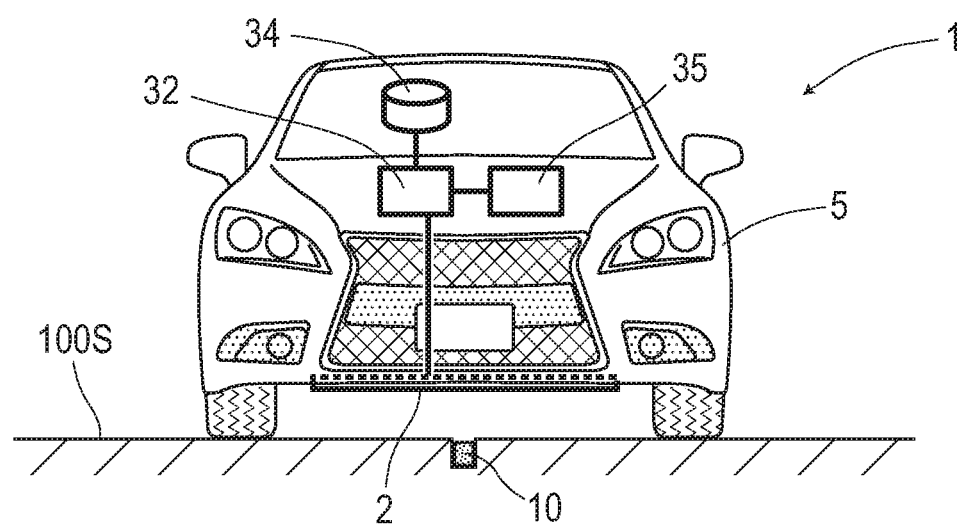
FIG. 1 is a descriptive diagram of a position capturing system in a first embodiment.

The position capturing system 1 is configured to include, as depicted in FIG. 1, a measuring unit 2 which performs detection and so forth of magnetic markers 10 laid in a road, a database 34 having stored (recorded) therein laying positions linked with polarities (polarity information) of the magnetic markers 10, a GPS unit 35 which forms one example of a positioning part which measures a position, and a position capturing unit 32 forming a position capturing part which captures the own vehicle position. In the present embodiment, this position capturing system 1 is combined with an automatic driving system 6. Note that depiction of the automatic driving system 6 is omitted in FIG. 1.

In the following, after general description of the magnetic marker 10, details of the measuring unit 2, the position capturing unit 32, the GPS unit 35, and the database 34 are described. Then, an example of configuration of the automatic driving system 6 using the position capturing system 1 is described.

Figure 2:
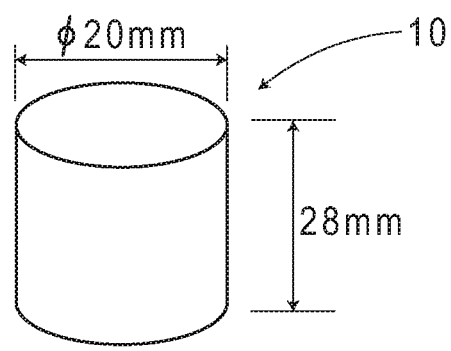
FIG. 2 is a descriptive diagram of a magnetic marker in the first embodiment.

The magnetic marker 10 is, as depicted in FIG. 1 and FIG. 2, a road marker to be laid in a road surface 100S of a road where a vehicle 5 travels. The magnetic markers 10 are arranged, for example, with spacing of 10 m along a center of a lane (reference numeral 100 in FIG. 3) divided by left and right lane marks.

The magnetic marker 10 is, as depicted in FIG. 2, formed in a columnar shape with a diameter of 20 mm and a height of 28 mm, and is laid in a state of being accommodated in an accommodation hole provided in the road surface 100S (refer to FIG. 1). A magnet forming the magnetic marker 10 is a ferrite plastic magnet with magnetic powder of iron oxide as a magnetic material dispersed in a polymer material as a base material, and has a characteristic of a maximum energy product (BHmax)=6.4 kJ/m$^3$.

The columnar magnetic marker 10 has an N pole on one end face side and an S pole on the other end face side. When this magnetic marker 10 is accommodated in the accommodation hole, the polarity to be determined on a vehicle 5 side differs depending on which end face is rendered upside. On the other hand, the magnetic strength is constant irrespective of which side is rendered upside. At a height of 250 mm, which is an upper limit of a range of 100 to 250 mm assumed as a mounting height of the measuring unit 2, magnetic flux density with which the magnetic marker 10 acts is 8 μT (microtesla) irrespective of the polarity. Note that in the following description, a magnetic marker 10 which acts on the vehicle 5 side with N-pole magnetism is referred to as an N-pole magnetic marker 10 and one which acts with S-pole magnetism is referred to as an S-pole magnetic marker 10.

Figure 3:
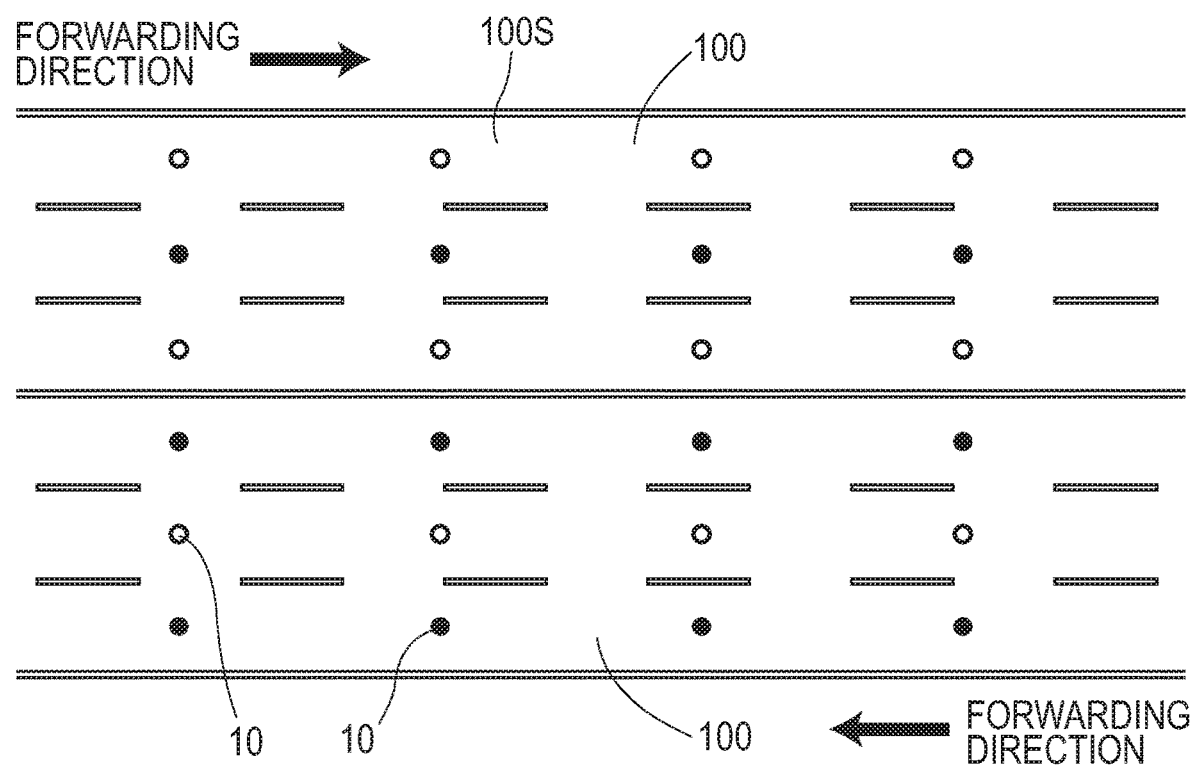
FIG. 3 is a descriptive diagram of magnetic marker laying specifications in the first embodiment.

In the present embodiment, as in FIG. 3 exemplarily depicting a road with three lanes on one side, the polarities of the magnetic markers 10 are switched for each lane 100. In the drawing, black circles indicate N-pole magnetic markers 10 and white circles indicate S-pole magnetic markers 10. When the vehicle 5 travels on the road in the drawing, for example, if the magnetic markers 10 on an own lane are S-pole magnetic markers, the magnetic markers 10 on other adjacent lanes are N-pole magnetic markers. Also, for example, if the magnetic markers 10 on the own lane are N-pole magnetic markers, the magnetic markers 10 on other adjacent lanes are S-pole magnetic markers. Note that the spacing between the magnetic markers 10 in a lane direction corresponding to a longitudinal direction of the road is 10 m. On the other hand, the spacing between adjacent magnetic markers 10 in a vehicle-width direction is 3.5 m, which is equal to a lane width.

Next, the measuring unit 2, the position capturing unit 32, the GPS unit 35, and the database 34 provided to the vehicle 5 are described.

Figure 4:
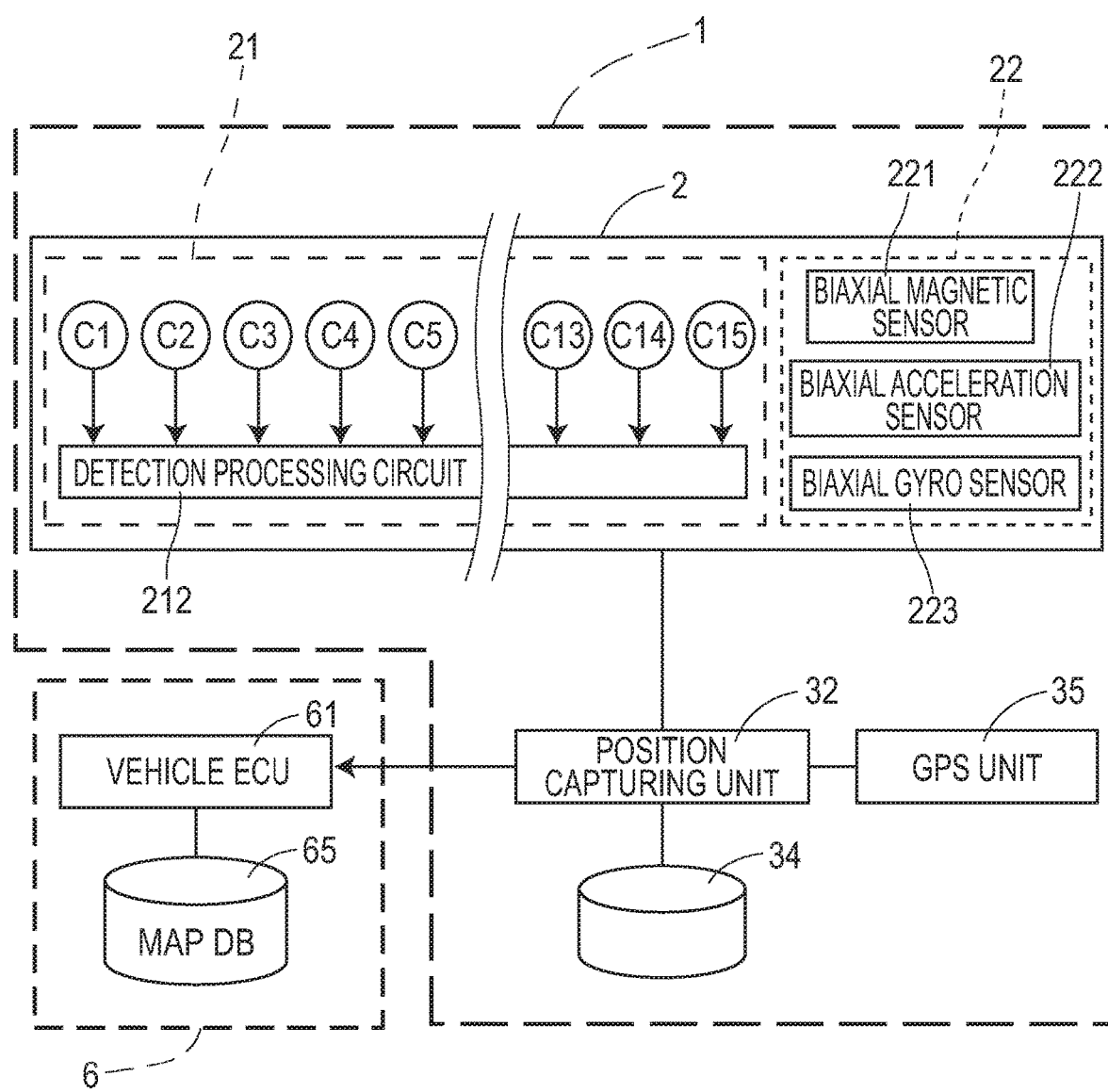
FIG. 4 is a block diagram depicting a system configuration on a vehicle side in the first embodiment.

The measuring unit 2 is, as depicted in FIG. 1 and FIG. 4, a unit with a sensor array 21 as a marker detecting part and an IMU (Inertial Measurement Unit) 22 which estimates a relative position by inertial navigation calculation integrated together. The measuring unit 2 is a stick-shaped unit elongated in the vehicle-width direction, and is mounted, for example, inside a front bumper of the vehicle 5 in a state of facing the road surface 100S. In the case of the vehicle 5 of the present embodiment, the mounting height of the measuring unit 2 with reference to the road surface 100S is set at 200 mm.

The sensor array 21 includes fifteen magnetic sensors Cn (n is an integer from 1 to 15) arrayed in a straight line equidistantly with 10 cm spacing and a detection processing circuit 212 having incorporated therein a CPU (Central Processing Unit) and so forth not depicted (refer to FIG. 4). In this sensor array 21, the fifteen magnetic sensors are arrayed in a direction along the vehicle-width direction and are mounted to the vehicle 5 so that the magnetic sensor C8 is positioned at a center of the vehicle 5.

The magnetic sensor Cn is a sensor which detects magnetism by using a known MI effect (Magneto Impedance Effect) in which an impedance of a magneto-sensitive body such as amorphous wire sensitively changes in accordance with an external magnetic field. In the magnetic sensor Cn, magneto-sensitive bodies such as amorphous wires not depicted are arranged along directions of two axes orthogonal to each other, thereby allowing detection of magnetism acting on the directions of two axes orthogonal to each other. In the present embodiment, the magnetic sensors Cn are incorporated in the sensor array 21 so as to be able to detect magnetic components in a forwarding direction and the vehicle-width direction of the vehicle 5.

The magnetic sensor Cn is a highly-sensitive sensor with a measurement range of magnetic flux density of ±0.6 mT and a magnetic flux density resolution in the measurement range of 0.02 µT. As described above, the magnetic marker 10 can act magnetism with a magnetic flux density equal to or larger than 8 µT in the range of 100 to 250 mm assumed as a mounting height of the magnetic sensor Cn. If the magnetic marker 10 acts magnetism with a magnetic flux density equal to or larger than 8 µT, it can be detected with high reliability by using the magnetic sensors Cn with a magnetic flux density resolution of 0.02 µT.

The detection processing circuit 212 (FIG. 4) of the sensor array 21 is an arithmetic circuit which executes marker detection process for detecting the magnetic marker 10, and so forth. This detection processing circuit 212 is configured to include a CPU (Central Processing Unit) not depicted, which executes various arithmetic processes, and memory elements such as a ROM (read only memory) and a RAM (random access memory) not depicted.

The detection processing circuit 212 executes a marker detection process by acquiring sensor signals outputted from each magnetic sensor Cn. Then, every time the marker detection process is executed, the detection result is inputted into the position capturing unit 32. While details will be described further below, in this marker detection process, in addition to detection of the magnetic marker 10, determination of the polarity of the detected magnetic marker 10 and measurement of a lateral shift amount of the vehicle 5 with reference to the magnetic marker 10 are performed.

The IMU 22 incorporated in the measuring unit 2 is an inertial navigation unit which estimates a relative position of the vehicle 5 by inertial navigation calculation. The IMU includes a biaxial magnetic sensor 221 as an electronic compass which measures an azimuth, a biaxial acceleration sensor 222 which measures acceleration, and a biaxial gyro sensor 223 which measures an angular velocity. The IMU 22 calculates a displacement amount by second-order integration of acceleration, and accumulates displacement amounts along changes in the forwarding direction of the vehicle 5 detected by the biaxial gyro sensor 223 and/or the measured azimuth to calculate a relative position with respect to a reference position. By using the relative position estimated by the IMU 22, the own vehicle position can be captured even when the vehicle 5 is positioned between the magnetic markers 10 adjacent to each other.

The position capturing unit 32 (FIG. 4) is a unit which controls the measuring unit 2 and captures the own vehicle position as the position of the vehicle 5 on a real-time basis. The position capturing unit 32 inputs the captured own vehicle position in the automatic driving system 6. Note that the measuring unit 2 is controlled so that the above-described marker detection process is executed in a frequency of 3 kHz so as to support high-speed traveling of the vehicle 5.

The position capturing unit 32 includes an electronic board (omitted in the drawing) having a CPU which executes various arithmetic processes as well as memory elements such as a ROM and a RAM implemented thereon. Methods of capturing the own vehicle position by the position capturing unit 32 differ when the vehicle 5 reaches the magnetic marker and when the vehicle 5 is positioned between adjacent magnetic markers 10 in the lane direction. While details will be described further below, in the former case, the position capturing unit 32 captures the own vehicle position based on the laying position of the magnetic marker 10 selectively acquired from the database 34. On the other hand, in the latter case, the position capturing unit 32 captures the own vehicle position by estimating a relative position in the IMU 22 by inertial navigation calculation.

The GPS unit 35 (FIG. 4) is a unit which measures the position of the vehicle 5 by receiving GPS waves. The GPS unit 35 measures the position when the sensor array 21 detects the magnetic marker 10, and inputs that measured position into the position capturing unit 32. A positioning error by the GPS unit 35 is such that the measured position is included in an error circle having a radius of 3 m with reference to a true value with a probability of 96% (2σ) or higher.

Note that the measured position by the GPS unit 35 is the position of the magnetic marker 10 which triggered the positioning by GPS. The GPS unit 35 calculates the position of the magnetic marker 10 which triggered the positioning by positionally shifting the measured position by an offset amount of the GPS unit 35 with reference to the sensor array 21 set in advance, a lateral shift amount with reference to the magnetic marker 10 measured by the sensor array 21, or the like. The GPS unit 35 inputs this position of the magnetic marker 10 as the measured position into the position capturing unit 32.

The database 34 (FIG. 4) is a database having the laying positions of the magnetic markers 10 stored therein. The database 34 is constructed by using, for example, an SSD (Solid State Drive), an HDD (Hard Disk Drive), or the like which has functions as a position information storage part. In this database 34, the laying positions are stored in a state of being linked with polarity information indicating polarities of the magnetic markers 10. The laying positions are position information indicating absolute positions of the magnetic markers 10.

The automatic driving system 6 is a system which uses the own vehicle position captured by the position capturing system 1 as described above. This automatic driving system 6 is configured to include, as in FIG. 4, a vehicle ECU 61 which performs automatic driving control and a map database (map DB) 65 which stores detailed three-dimensional map data (3D map data). Using the own vehicle position captured by the position capturing system 1 as one of control input values, the vehicle ECU 61 controls a steering-wheel steering unit, an engine throttle, a brake, and so forth not depicted to cause the vehicle 5 to travel automatically.

Next, (1) the marker detection process by the position capturing system 1 and (2) a flow of whole operation of the vehicle 5 including the position capturing system 1 of the present embodiment are described.

(1) Marker Detection Process

The marker detection process is a process to be executed by the sensor array 21 of the measuring unit 2. The sensor array 21 executes a marker detection process with a frequency of 3 kHz using the magnetic sensors Cn.

As described above, the magnetic sensors Cn provided in the sensor array 21 each detects magnetic components in the forwarding direction and the vehicle-width direction of the vehicle 5. For example, when this magnetic sensor Cn moves in the forwarding direction and passes straight above the magnetic marker 10, a magnetic measurement value in the forwarding direction is reversed between positive and negative before and after each magnetic marker 10 as in FIG. 5 and FIG. 6, and changes at a position straight above the magnetic marker 10 so as to cross zero. Therefore, during traveling of the vehicle 5, regarding the magnetic measurement value in the traveling direction detected by any of the magnetic sensors Cn, when a zero cross Zc where its sign is reversed occurs, it can be determined that the measuring unit 2 is positioned straight above the magnetic marker 10. The detection processing circuit 212 determines that the magnetic marker 10 is detected when the measuring unit 2 is positioned straight above the magnetic marker 10 and the zero cross Zc of the magnetic measurement value in the forwarding direction occurs.

Figure 5:
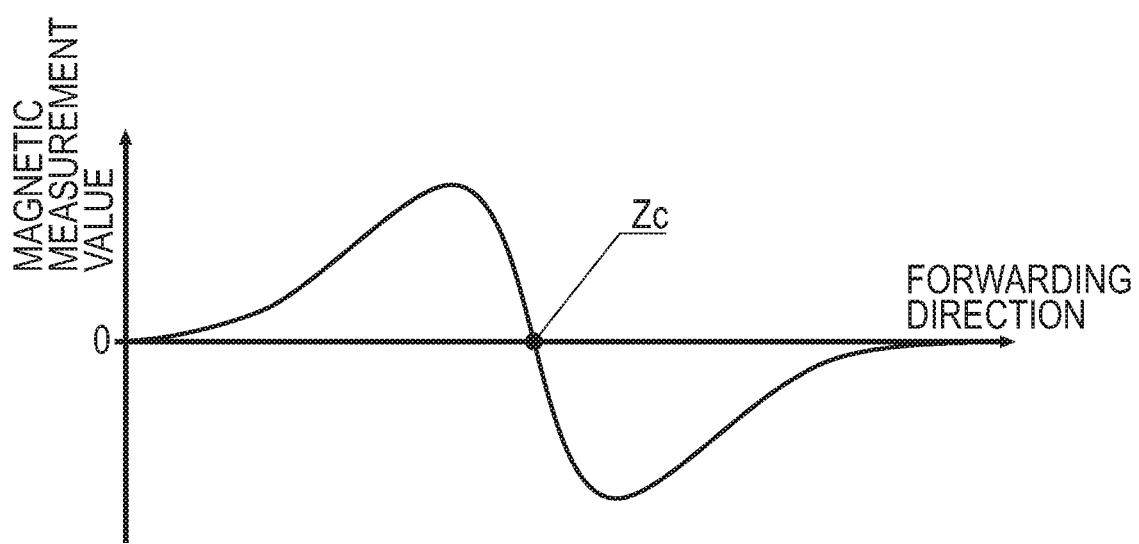
FIG. 5 is a descriptive diagram exemplarily depicting changes of a magnetic measurement value in a forwarding direction at a time of passage over an S-pole magnetic marker in the first embodiment.
Figure 6:
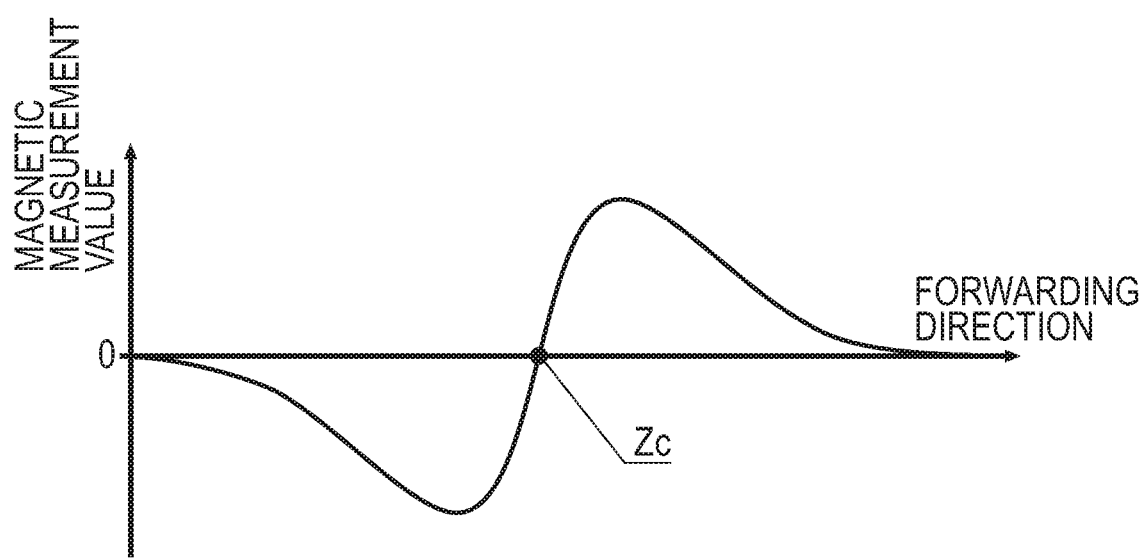
FIG. 6 is a descriptive diagram exemplarily depicting changes of a magnetic measurement value in a forwarding direction at the time of passage over an N-pole magnetic marker in the first embodiment.

Furthermore, as for temporal changes of the magnetic measurement value in the forwarding direction in FIG. 5 and FIG. 6, a sign of a gradient at the zero cross Zc differs in accordance with the polarity of the magnetic marker 10. In the configuration of the magnetic sensors Cn of the present embodiment, the polarity is an S pole for a negative gradient in FIG. 5 and is an N pole for a positive gradient in FIG. 6. The sensor array 21 determines the polarity from the sign of the gradient at the zero cross Zc when detecting the magnetic marker 10.

Figure 7:
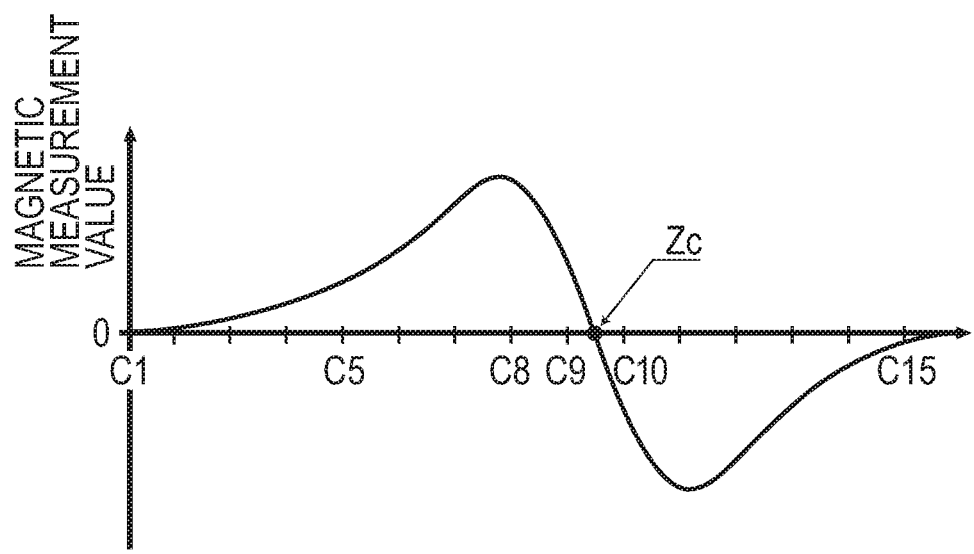
FIG. 7 is a descriptive diagram exemplarily depicting a distribution curve of magnetic measurement values in a vehicle-width direction by magnetic sensors Cn arrayed in the vehicle-width direction in the first embodiment.

Also, for example, as for a magnetic sensor with the same specifications as those of the magnetic sensors Cn, assume a movement along a virtual line in the vehicle-width direction passing straight above the magnetic marker 10. In this assumption, a magnetic measurement value in the vehicle-width direction is reversed between positive and negative on both sides across the magnetic marker 10 and changes so as to cross zero at a position straight above the magnetic marker 10. In the case of the measuring unit 2 with the fifteen magnetic sensors Cn arrayed in the vehicle-width direction, the sign of the magnetic measurement values in the vehicle-width direction detected by the magnetic sensors Cn differs depending on which side the sensor is present with reference to the magnetic marker 10 (FIG. 7).

Based on a distribution curve in FIG. 7 exemplarily depicting magnetic measurement values in the vehicle-width direction of the respective magnetic sensors Cn of the measuring unit 2, a position between two adjacent magnetic sensors Cn across the zero cross Zc where the sign of the magnetic measurement value in the vehicle-width direction is reversed between positive and negative or a position straight below the magnetic sensor Cn where the detected magnetic measurement value in the vehicle-width direction is zero and the signs of the magnetic measurement values of the magnetic sensors Cn on both outer sides are reversed is the position of the magnetic marker 10 in the vehicle-width direction. The detection processing circuit 212 measures, as the above-described lateral shift amount, a deviation in position of the magnetic marker 10 in the vehicle-width direction with respect to a central position of the measuring unit 2 (the position of the magnetic sensor C8). For example, in the case of FIG. 7, the position of the zero cross Zc is a position corresponding to C9.5 approximately at a midpoint between C9 and C10. As described above, since spacing between the magnetic sensors C9 and C10 is 10 cm, the lateral shift amount of the magnetic markers 10 is (C9.5−C8)×10 cm=15 cm with reference to C8 positioned at the center of the measuring unit 2 in the vehicle-width direction.

(2) Whole Operation of Vehicle 5

Figure 8:
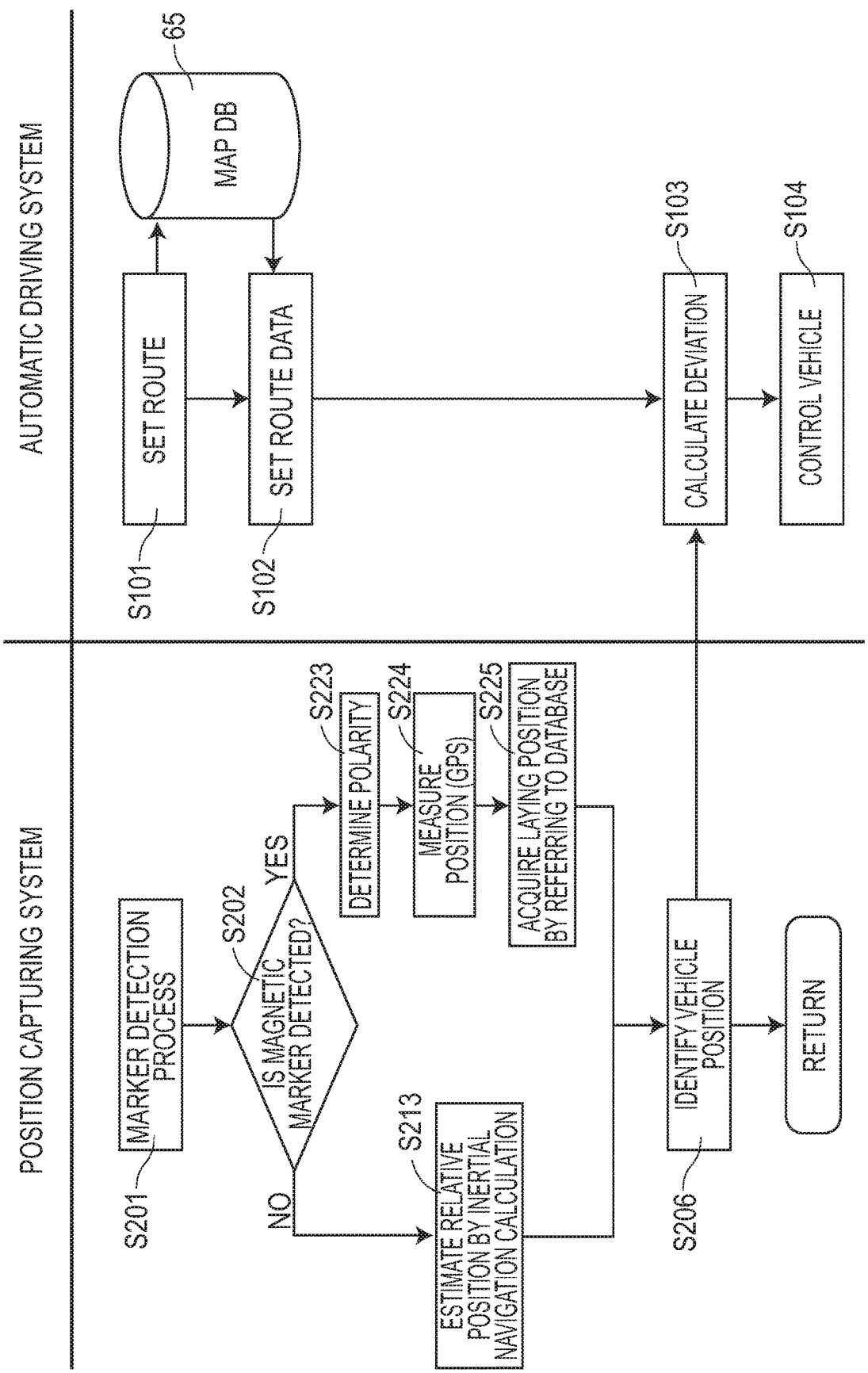
FIG. 8 is a descriptive diagram of system operation in the first embodiment.
Figure 9:
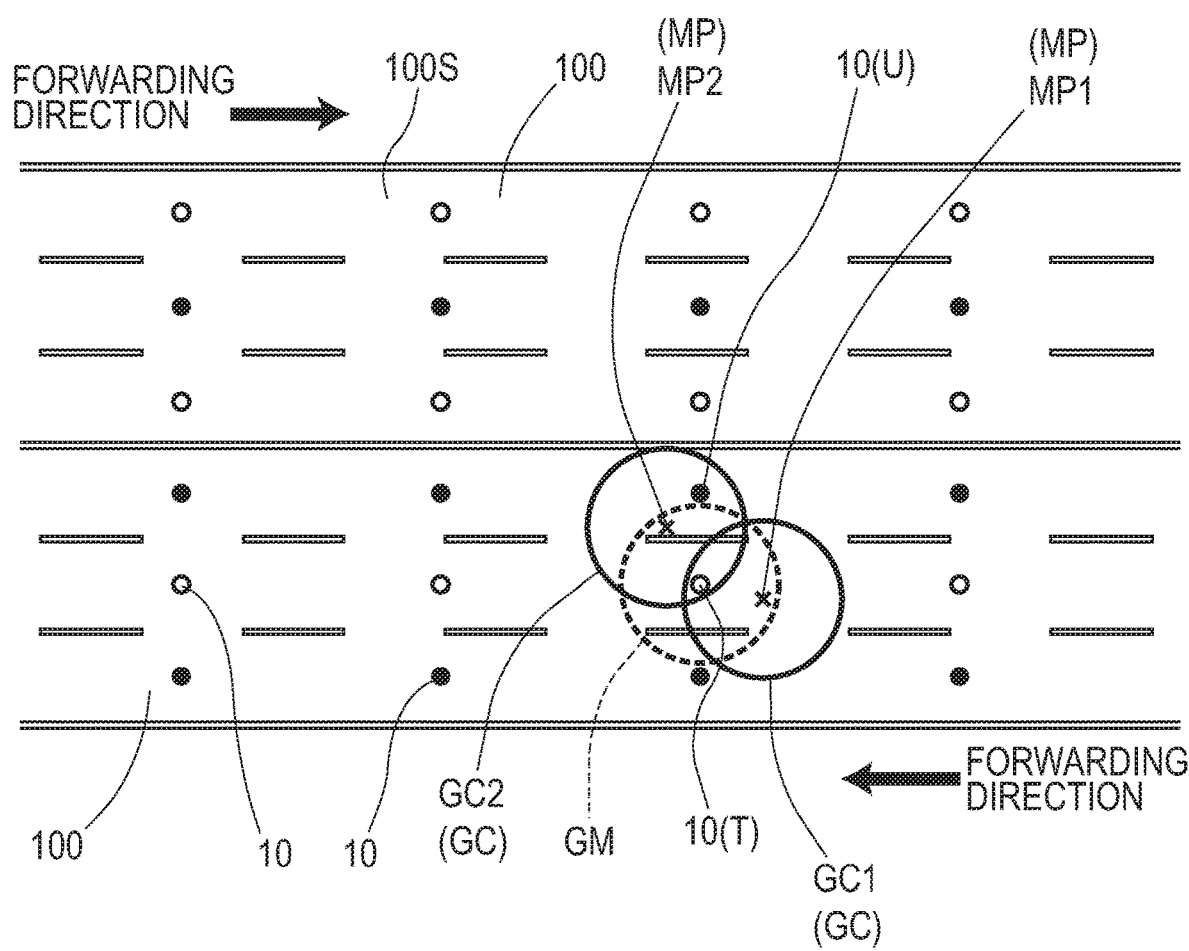
FIG. 9 is a descriptive diagram of a magnetic marker selection method in the first embodiment.
Figure 10:
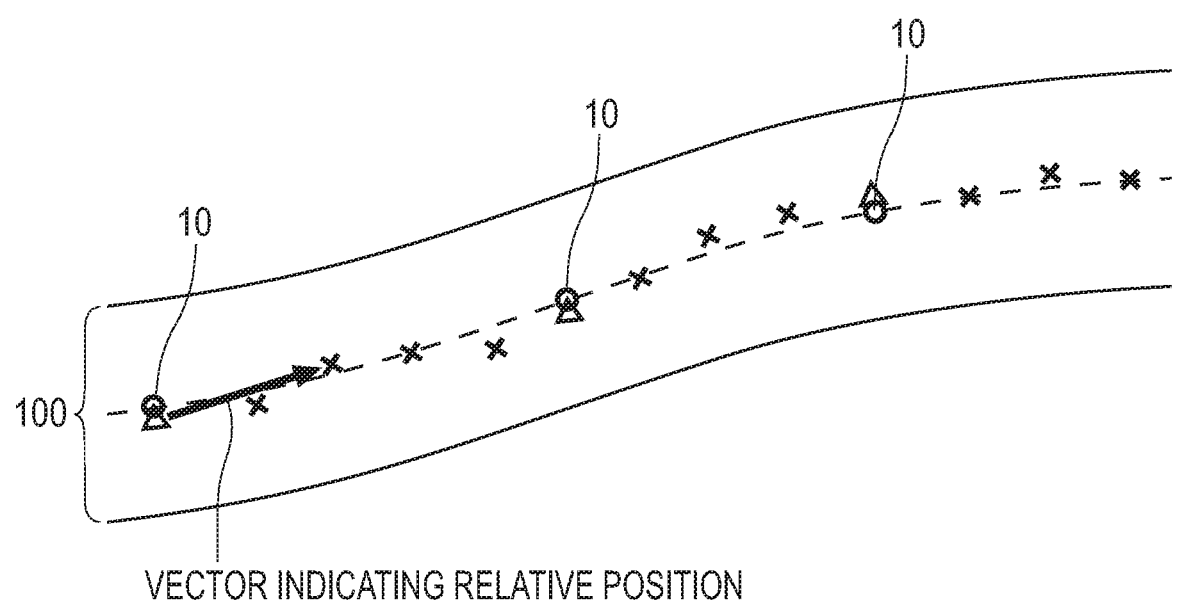
FIG. 10 is a descriptive diagram of a method of capturing an own vehicle position by the position capturing system in the first embodiment.
Figure 11:
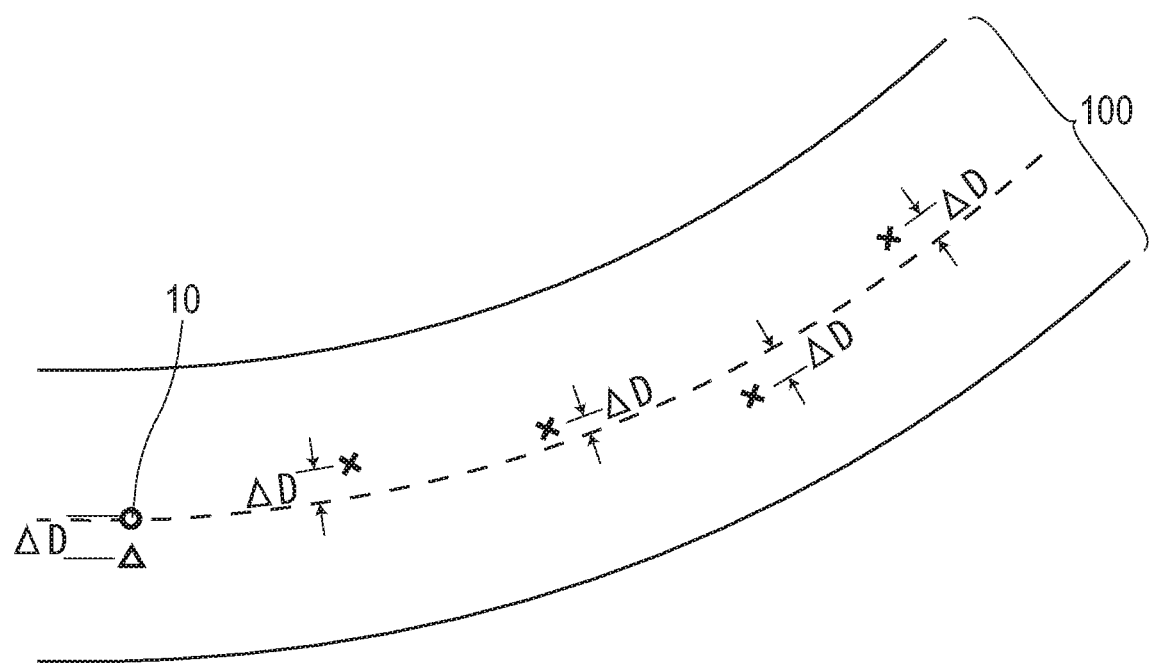
FIG. 11 is a descriptive diagram indicating deviation of the own vehicle position with reference to a traveling route in the first embodiment.

Next, the whole operation of the vehicle 5 including the position capturing system 1 and the automatic driving system 6 is described along a flowchart of FIG. 8 with reference to FIG. 9 to FIG. 11.

When a traveling route is set to the automatic driving system 6 (S101), corresponding data is read from the map DB 65 storing 3D map data, and detailed route data as a control target for automatic driving is set (S102). The route data is data including at least a series of points represented by position data of absolute positions, for example, as indicated by a broken line in FIG. 10.

On the other hand, the position capturing system 1 under control mode in which the vehicle 5 travels by automatic driving repeatedly executes the above-described marker detection process by the sensor array 21 (S201). When the sensor array 21 detects any magnetic marker 10 (S202: YES), a determination on the polarity of the magnetic marker 10 is made (S223), and a measured position by the GPS unit 35 is acquired (S224).

Upon acquiring a measured position by the GPS unit 35, the position capturing unit 32 refers to the database 34 to selectively acquire a laying position corresponding to the magnetic marker 10 detected by the sensor array (S225). Specifically, when any magnetic marker 10 is detected, the position capturing unit 32 acquires a measured position by the GPS unit 35 and sets a specified area GC (refer to FIG. 9) with a radius of 3 m equal in size to the above-described error circle GM of GPS with reference to this measured position. Then, from among the laying positions stored in the database 34, a laying position located in this specified area GC and linked with polarity information which complies by matching with the polarity determined at the above-described step S223 is selected.

Here, as described above, while the spacing between the magnetic markers 10 in the lane direction is 10 m, the spacing between adjacent magnetic markers 10 in the vehicle-width direction is as narrow as 3.5 m. As described above, when the error circle GM of GPS has a radius of 3 m, a plurality of laying positions of the magnetic markers 10 may be included in the specified area GC with the radius of 3 m with reference to the measured position MP in that error circle GM. Note that the error circle GM in FIG. 9 indicates an area in which the measured position by GPS when the magnetic marker 10(T) is detected is included with a probability of 96% or higher.

For example, when an x mark for MP1 in FIG. 9 in this error circle GM indicates an actual measured position, the laying position of another magnetic marker 10 other than the laying position of the magnetic marker 10(T) is not included in the specified area GC1 having a radius of 3 m with reference to this measured position MP1. In this case, the laying position of the magnetic marker 10(T) can be selected with high reliability from within a specified area GC1.

On the other hand, for example, when an x mark for MP2 in FIG. 9 in the error circle GM indicates an actual measured position, another magnetic marker 10(U) positioned on other adjacent lane and adjacent to the magnetic marker 10(T) in the vehicle-width direction is included in a specified area GC2 with a radius of 3 m with reference to this measured position MP2. Here, as described above, on the road of FIG. 9, the adjacent magnetic marker 10(U) on the other lane has a polarity different from that of the magnetic marker 10(T) on the own lane. If polarity information linked to each laying position is used when selectively acquiring a laying position by referring to the database 34, the laying position of the magnetic marker 10(U) can be precluded, and the laying position corresponding to the magnetic marker 10(T) can be selected with high reliability.

Upon selectively acquiring the laying position corresponding to the magnetic marker 10 detected as described above, the position capturing unit 32 captures the own vehicle position based on this laying position (S206). Specifically, a corrected position is obtained by positionally shifting this laying position by the lateral shift amount measured by the measuring unit 2 in the marker detection process, and captured as the own vehicle position (a position with a triangle mark in FIG. 10).

On the other hand, when the vehicle 5 is positioned between adjacent magnetic markers 10 and any magnetic marker 10 cannot be detected (S202: NO), an own vehicle position (a position with a triangle mark in FIG. 10) captured based on the laying position of the magnetic marker 10 detected immediately before is taken as a reference position, and a relative position of the vehicle 5 is estimated by inertial navigation calculation (S213). Specifically, as described above, a displacement amount is calculated by second-order integration of measurement acceleration by the IMU 22 incorporated in the measuring unit 2, and these displacement amounts are accumulated along changes in the forwarding direction of the vehicle 5 detected by the biaxial gyro sensor 223 and the measured azimuth, thereby estimating the relative position of the vehicle 5 with respect to the above-described reference position. Then, as exemplarily depicted in FIG. 10, a position with an x mark acquired by displacing the position from the reference position by this relative position is captured as an own vehicle position. Note that FIG. 10 depicts one example of a vector indicating this relative position.

The own vehicle positions (positions with a triangle mark and an x mark in FIG. 10) captured by the position capturing system 1 are inputted into the vehicle ECU of the automatic driving system 6. The vehicle ECU 61 calculates a deviation ΔD with reference to the route data indicated by a broken line in FIG. 11 as a control target (S103). Then, the vehicle ECU 61 performs vehicle control such as steering control, throttle control, and so forth based on this deviation ΔD (S104) to achieve automatic traveling.

As described above, in the position capturing system 1 of the present embodiment, when any magnetic marker 10 is detected, a corresponding laying position is selected by referring to the database 34, and an own vehicle position is captured by using the selected laying position. In this position capturing system 1, the measured position by GPS is not directly captured as the own vehicle position. With reference to the measured position by GPS, a specified area is merely set for selecting a laying position from the database 34. Therefore, in the position capturing system 1, an influence of a positioning error by GPS can be avoided, and the own vehicle position can be captured with high accuracy.

In the present embodiment, a specified area (the area indicated by a reference letter GC in FIG. 9) equal in size to the error circle (with a radius of 3 m) of GPS is set. On the other hand, since the lane width of the road is 3.5 m, there is a possibility that a laying position of the magnetic marker 10 on other adjacent lane as well as a laying position of the magnetic marker 10 on the own lane may be included in the specified area with the radius of 3 m with reference to any measured position in the error circle of GPS. Thus, in the present embodiment, as for a combination of the magnetic markers 10 adjacent to each other in the vehicle-width direction, the polarities of the magnetic markers 10 are switched for each lane 10 so as to avoid having the same polarity (refer to FIG. 9). And, in this position capturing system 1, polarity information indicating the polarities of the magnetic markers 10 laid in this manner is linked to the laying positions and stored in the database 34.

By using the polarity information linked to the laying positions, it is possible to distinguish between the laying position of the magnetic marker 10 on the own lane and the laying position of the magnetic marker 10 on other adjacent lane. When a laying position is selected from the database 34 at a time of detection of any magnetic marker 10, by using the polarity information of the detected magnetic marker 10, the laying position of the magnetic marker 10 on other adjacent lane can be precluded with high reliability. And, if the laying position of the detected magnetic marker 10 can be acquired, the own vehicle position can be captured with high accuracy.

Note that in place of positioning by the GPS unit 35, a current location may be acquired with relatively low accuracy by identifying an intersection by image recognition or the like of a structure in a road environment such as a traffic board indicating an intersection name or traffic lights (one mode of positioning). When any magnetic marker 10 is detected, a corresponding laying position may be selected by referring to the database 34 of the laying position by using this current location with low accuracy.

In the present embodiment, the configuration is exemplarily described in which, during a period after passage over any magnetic marker 10 until detection of the next magnetic marker 10, by taking the own vehicle position captured at the time of detection of any magnetic marker 10 immediately before as a reference position, a relative position is estimated by inertial navigation calculation and a new own vehicle position is captured. A configuration may be adopted in which, when the next magnetic marker 10 is detected, the own vehicle position captured by using inertial navigation calculation is used as the measured position to select a laying position from the database 34. This configuration is effective in an environment where positioning by GPS is infeasible, for example, in a tunnel or the like.

In the present embodiment, the position capturing system 1 which is to be combined with the automatic driving system 6 is exemplarily described. In place of the automatic driving system 6, the invention may be applied to a departure warning system which warns of a departure from the lane 100, a lane keep system which automatically operates the steering wheel to travel along the lane 100 or generates a steering assist force for avoiding a departure from the lane 100, a navigation system or the like which performs route guidance and so forth.

Note that in the present embodiment, the database is constructed by using an SSD or HDD separate from the position capturing unit 32. In place of this, the memory element such as the RAM of the position capturing unit 32 may be used to configure the database 34.

Furthermore, if the vehicle 5 can connect to a communication line such as the Internet, a server device may be provided with a database having laying positions stored therein. In this case, a configuration may be adopted in which the vehicle 5 having detected any magnetic marker 10 transmits the measured position by GPS together with the polarity to the server device and the server device returns the laying position of that magnetic marker 10. Still further, a configuration may be such that the vehicle 5 also transmits a lateral shift amount to the server device and the server device returns the position of the vehicle 5 corrected with the lateral shift amount.

Second Embodiment

Figure 12:
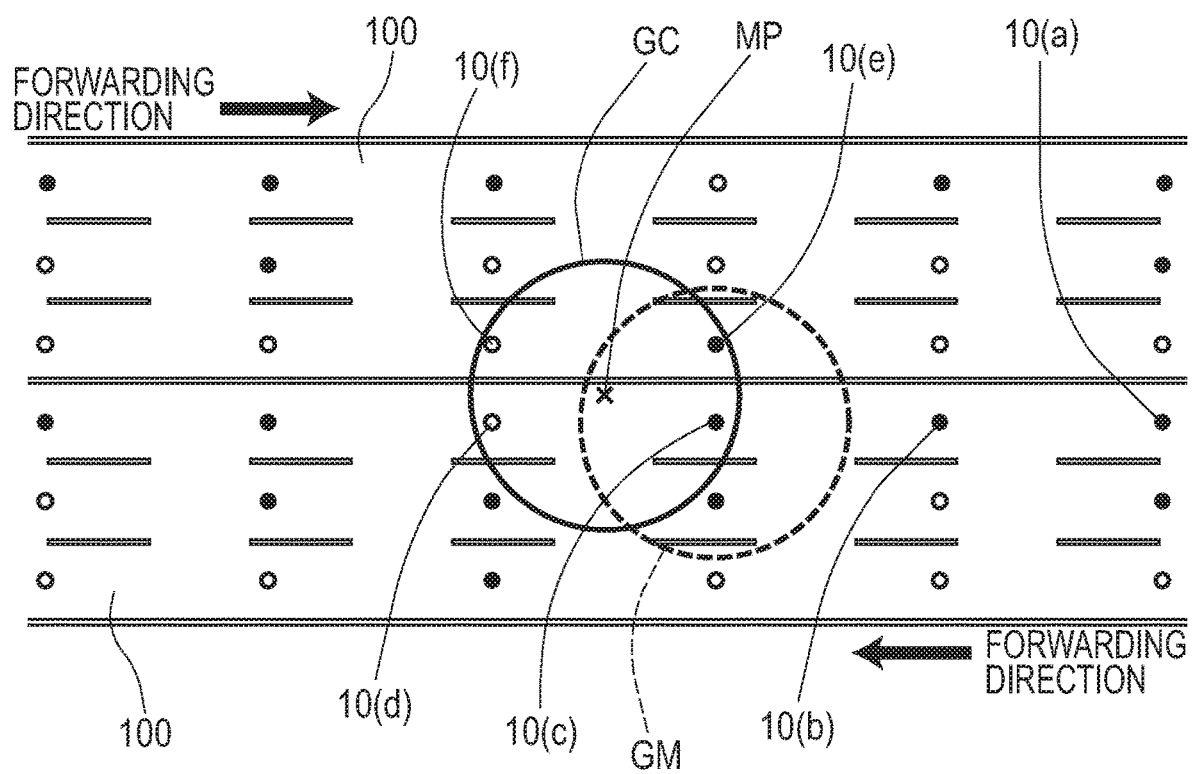
FIG. 12 is a descriptive diagram depicting laying specifications of magnetic markers in a second embodiment.

The present embodiment is an example in which, based on the position capturing system of the first embodiment, the configuration of the position capturing system is changed so as to be able to support a road environment with low positioning accuracy by GPS. Details of this are described with reference to FIG. 12.

The road environment to be exemplarily described is a road environment where, for example, a receiving state of GPS waves is not favorable because of tall buildings being present along the road. For example, in this road environment, the positioning error of GPS is approximately twice as large as that of the first embodiment, and an error circle where the measured position belongs with a probability of 96% has a size with a radius of 6 m. As a specified area to be set with reference to the measured position by GPS, a specified area with the same radius of 6 m as the size of the error circle of GPS is set.

To support the error circle with the radius of 6 m, in the position capturing system 1 of the present embodiment, the laying specifications of the magnetic markers 10 are different from those of the first embodiment. While the spacing of arrangement in the lane direction is similar to that of the first embodiment, that is, 10-meter spacing, the polarities of the magnetic markers 10 are different from those of the first embodiment. As in FIG. 12, the polarities of the magnetic markers 10 are not constant for each lane 100, but the polarities are switched nearly in a random manner in the lane direction. In the drawing, N-pole magnetic markers 10 are indicated by black circles, and S-pole magnetic markers 10 are indicated by white circles.

When an error of GPS is represented by the error circle GM having the radius of 6 m, there is a possibility that the laying positions of the magnetic markers 10 at four to five locations at maximum may be included in the specified area GC having the radius of 6 m with reference to any measured position in this error circle GM. For example, when the measured position by GPS at the time of detection of the magnetic marker 10(*c*) is present at an x mark for a reference letter MP in FIG. 12, the specified area GC with the radius of 6 m is set with reference to this measured position MP. In this specified area GC, the laying positions of the magnetic markers 10 at four locations are included. Here, it is difficult to select the laying position of the magnetic marker 10(*c*) from among the respective laying positions corresponding to magnetic markers 10(*c*) to 10(*f*) merely on basis of the polarity of the magnetic marker 10(*c*).

Thus, in the present embodiment, the configuration of the polarity information linked to the laying position in the database 34 is changed. This polarity information is information with a combination of the polarities of the magnetic marker 10 corresponding to the laying position and two magnetic markers 10 positioned so as to be adjacent to each other on an upstream side with respect to this magnetic marker 10 in the forwarding direction of the vehicle 5. For example, as for the magnetic marker 10(*c*), its polarity is an N pole, and the polarities of two magnetic markers 10(*a*) and 10(*b*) adjacent to each other on the upstream side in the forwarding direction are an N pole and an N pole. Therefore, the polarity information to be linked to the laying position of the magnetic marker 10(*c*) is NNN. Also, when the vehicle travelling in the forwarding direction along the lane 100 detects the magnetic marker 10(*c*), three magnetic markers 10 detected immediately before including this magnetic marker 10(*c*) are three magnetic markers 10(*a*), 10(*b*), and 10(*c*). And, the combination of the polarities of these three magnetic markers 10(*a*) to 10(*c*) is NNN.

For example, the polarity information to be linked to a magnetic marker 10(*e*) on the lane 100 where the forwarding direction is different from that on the lane 100 where the vehicle is positioned is SSN. Also, for example, the polarity information to be linked to a magnetic marker 10(*d*) on the lane 100 with the same forwarding direction is NNS. When the magnetic marker 10(*c*) is detected in this manner, in the specified area GC with the radius of 6 m set with reference to the measured position MP by GPS, the laying position linked with the polarity information of NNN is the laying position corresponding to the magnetic marker 10(*c*) only. Therefore, when the vehicle 5 detects the magnetic marker 10(*c*), it is possible to select the laying position of the magnetic marker 10(*c*) with high reliability by taking the laying position linked with NNN which is a combination of polarities of the magnetic markers 10 detected immediately before.

If the polarity information is a combination of polarities of three magnetic markers 10 as described above, the polarity information can represent 2×2×2=8 values. With polarity information in eight values, it is possible to select a correct laying position from among around four or five locations at maximum of the laying positions of the magnetic markers 10 included in the specified area GC. Note that polarity information with a combination of polarities of four magnetic markers 10 or more may be adopted or polarity information with a combination of polarities of two magnetic markers 10 may be adopted. Qualitatively, as the error circle of GPS expands, it is required to set a larger specified area with reference to the measured position, and the number of laying positions included in the specified area increases. Thus, when the error of GPS is large and the error circle of GPS is large, the number of magnetic markers 10 configuring polarity information is preferably increased.

Note that the polarity information is information of a history of the polarities of the magnetic markers 10 that were determined on the vehicle side during traveling along the lane 100. In a case such as when the vehicle changes the lane 100, it becomes difficult to use the polarity information. Thus, it is preferable to adopt a configuration in which an activation signal for a direction indicator is captured and when this activation signal is acquired, the use of the polarity information is cancelled, and a configuration in which when a yaw rate or lateral acceleration more than a threshold occurs, the status is determined as not suitable for traveling along the lane 100, and the use of the polarity information is cancelled, or the like.

Note that other configurations and operations and effects are similar to those of the first embodiment.

While the specific examples of the present invention have been described above in detail as in the embodiments, these specific examples merely disclose examples of technologies included in the claims. Needless to say, the claims should not be restrictively construed by the configurations, numerical values, and so forth of the specific examples. The claims include technologies obtained by variously modifying, changing, and combining the specific examples as appropriate by using known technologies, knowledge by people skilled in the art, and so forth.

REFERENCE SIGNS LIST

1 position capturing system
10 magnetic marker
2 measuring unit
21 sensor array (marker detecting part)
212 detection processing circuit
22 IMU
32 position capturing unit (position capturing part)
34 database (position information storage part)
36 GPS unit (positioning part)
5 vehicle
6 automatic driving system
61 vehicle ECU
65 map database (map DB)

The invention claimed is:

1. A position capturing system comprising:
a vehicle provided with a marker detecting part which magnetically detects a magnetic marker laid in a road and determines a polarity of the magnetic marker and a positioning part which measures a position;

a position information storage part having stored therein laying positions of each of magnetic markers linked with polarity information indicating the polarity of the magnetic marker; and a position capturing part which selects, when any of the magnetic markers is detected, a laying position corresponding to said any magnetic marker from among the laying positions stored in the position information storage part and captures the laying position or a corrected position with reference to the laying position as a position of the vehicle, wherein the position capturing part sets a specified area with reference to a measured position by the positioning part at a time of detection of said any magnetic marker and selects, from among the laying positions located in the specified area, a laying position linked with the polarity information which complies with the polarity of the magnetic marker detected by the marker detecting part.

2. The position capturing system according to claim 1, wherein the marker detecting part is capable of measuring a lateral shift amount of the vehicle as a deviation in a vehicle-width direction with reference to the magnetic marker, and the position capturing part captures the corrected position obtained by correcting the selected laying position with the lateral shift amount as the position of the vehicle.

3. The position capturing system according to claim 2, wherein the polarity information is information indicating the polarity of any one of the magnetic markers, and the position capturing part selects the laying position where the polarity indicated by the linked polarity information matches the polarity of the magnetic marker detected by the marker detecting part.

4. The position capturing system according to claim 2, wherein the polarity information is information with a combination of polarities of a plurality of magnetic markers laid along a longitudinal direction of the road, and the position capturing part selects the laying position where the combination of the polarities of the plurality of magnetic markers indicated by the linked polarity information matches a combination of polarities of a plurality of magnetic markers detected by the magnetic marker detecting part immediately before.

5. The position capturing system according to claim 1, wherein the polarity information is information indicating the polarity of any one of the magnetic markers, and the position capturing part selects the laying position where the polarity indicated by the linked polarity information matches the polarity of the magnetic marker detected by the marker detecting part.

6. The position capturing system according to claim 1, wherein the polarity information is information with a combination of polarities of a plurality of magnetic markers laid along a longitudinal direction of the road, and the position capturing part selects the laying position where the combination of the polarities of the plurality of magnetic markers indicated by the linked polarity information matches a combination of polarities of a plurality of magnetic markers detected by the magnetic marker detecting part immediately before.

7. A position capturing method of capturing, by a vehicle including a positioning part which measures a position, an own vehicle position by using a magnetic marker laid in a road, the method comprising:

a step of setting a specified area, when any of the magnetic markers is detected, with reference to a measured position by the positioning part at a time of detection of said any magnetic marker; and a step of selecting, by referring to a database of laying positions of each of the magnetic markers stored as linked with polarity information indicating the polarity of the magnetic marker, a laying position located in the specified area and linked with the polarity information which complies with the polarity of the detected magnetic marker, wherein the selected laying position or a corrected position with reference to the selected laying position is captured as a position of the vehicle.

* * * * *